(12) United States Patent
Lundberg et al.

(10) Patent No.: US 7,899,733 B2
(45) Date of Patent: Mar. 1, 2011

(54) METHOD AND A SYSTEM FOR TRADING VIRTUAL INSTRUMENTS

(75) Inventors: Jonas Lundberg, Stockholm (SE); Daniel Negishi, Stockholm (SE)

(73) Assignee: OMX Technology AB, Stockholm (SE)

( * ) Notice: Subject to any disclaimer, the term of this patent is extended or adjusted under 35 U.S.C. 154(b) by 2508 days.

(21) Appl. No.: 10/279,007

(22) Filed: Oct. 24, 2002

(65) Prior Publication Data
US 2003/0097328 A1 May 22, 2003

(30) Foreign Application Priority Data
Nov. 1, 2001 (SE) .................................. 0103642

(51) Int. Cl.
G06Q 40/00 (2006.01)
(52) U.S. Cl. ........................................ 705/37
(58) Field of Classification Search ............ 705/36 R, 705/37, 38, 39, 40
See application file for complete search history.

(56) References Cited

U.S. PATENT DOCUMENTS

| | | | |
|---|---|---|---|
| 4,648,038 A | 3/1987 | Roberts et al. | |
| 5,946,667 A | 8/1999 | Tull, Jr. et al. | |
| 6,035,287 A | 3/2000 | Stallaert et al. | |
| 6,304,858 B1 * | 10/2001 | Mosler et al. | 705/37 |
| 7,177,833 B1 * | 2/2007 | Marynowski et al. | 705/38 |
| 7,243,083 B2 * | 7/2007 | Burns et al. | 705/37 |
| 7,409,367 B2 * | 8/2008 | McGill et al. | 705/37 |
| 7,599,876 B1 * | 10/2009 | Lo et al. | 705/37 |
| 2002/0007335 A1 * | 1/2002 | Millard et al. | 705/37 |
| 2002/0026399 A1 | 2/2002 | Narayan et al. | |
| 2002/0035532 A1 | 3/2002 | Halpern | |
| 2002/0194115 A1 * | 12/2002 | Nordlicht et al. | 705/37 |
| 2008/0065529 A1 * | 3/2008 | Bowen et al. | 705/37 |

OTHER PUBLICATIONS

NPL-1, Ref 1 : Andrew Winston; Digital Technology; Financial Post, p. 12; Aug. 7, 2001.*
NPL-2, Ref2 : CME—Start of electronic spread trading for Eurodollars on GLOBEX. M2 Presswire, NA Jun. 13, 2002.*
NPL-3, Ref 4: Euromoney World Equity Supplement pp. 116-117 May 1993 ISSN: 0014-2433 JRNL Code: ERM.*
U.S. Appl. No. 10/616,224, filed Jul. 10, 2003, Lundberg et al.

* cited by examiner

*Primary Examiner*—Hani Kazimi
*Assistant Examiner*—Hatem Ali
(74) *Attorney, Agent, or Firm*—Nixon & Vanderhye P.C.

(57) ABSTRACT

In an automated exchange system, a separate virtual instrument is used in the matching process of the system. The virtual instrument guarantees that both a derivative instrument and its underlying instrument are traded together. The underlying instrument, i.e. the instrument in which derivative instruments are traded, is then preferably displayed together with the virtual instruments. The underlying instrument is presented with a price. The matching of the virtual instrument can take place in a matching module of the automated exchange system. After a trade in a virtual instrument is matched in the matching process of the system, the match is reported to a subsequent deal capture module where the corresponding different trades or deals of the virtual instrument are formed. The trades or deals formed in the deal capture module do not need to be matched because the number of instruments and the price can be deduced from the information relating to the virtual instrument.

14 Claims, 3 Drawing Sheets

Fig. 2

|     | Instrument        | Delta | Bid Prc | Off Prc |
|-----|-------------------|-------|---------|---------|
| Leg | IBM_PUT_DEC_5.50  | 0.79  | 1.63    | 1.65    |
| Leg | IBM_PUT_DEC_5.00  | 0.53  | 1.09    | 1.11    |
| Leg | IBM_PUT_DEC_4.50  | 0.17  | 0.65    | 0.69    |
| Leg | IBM_CALL_DEC_5.50 | 0.21  | 0.43    | 0.45    |
| Leg | IBM_CALL_DEC_5.00 | 0.46  | 1.03    | 1.04    |
| Leg | IBM_CALL_DEC_4.50 | 0.73  | 1.41    | 1.42    |
| Ref | IBM               |       | 4.90    | 4.90    |

METHOD AND A SYSTEM FOR TRADING VIRTUAL INSTRUMENTS

TECHNICAL FIELD

The present invention relates to an automated exchange system, and in particular to an automated exchange designed for trading derivative contracts.

BACKGROUND

In some exchanges so called derivative contracts are traded. Derivative contracts are contracts that are derived from underlying contracts. The underlying contracts can for example be stock, bond, or commodity contracts. The underlying contract can also in some cases in itself be a derivative contract. The price for the derivative contract is dependent on the price of the underlying contract(s). Examples of derivative contracts include option contracts and future contracts of different types.

In the case of a future contract there is a direct correlation between the future contract price and the price for the underlying contract. Thus if, for example, the price for a particular stock increases by one dollar, the price for the future contract having that particular stock as an underlying contract will also increase by one dollar.

However, this direct correlation is not valid for most types of derivative contracts. For example the price of an option may depend on the underlying price as a factor*(the change in the underlying price), where the factor is between nil and one for a call option and nil and minus one for a put option. This means that if the price of the underlying contract increases by one the price of a call option will always increase by at the most one. This factor is usually termed delta or delta value.

In the market there are several types of trader parties. One particular type of trader party is the market maker which is a market participant obliged to provide prices to the market in one or several instruments traded in the market. The market maker gains from the trading by having a small spread between its buy and sell prices. The market maker does not want to hold the risk in any instrument it trades. However, if the market maker provides prices to the market in a derivative contract and somebody else trades against those prices, the market maker is left with what is termed an open position. This means that the market maker will lose or make money if the price of the underlying contract changes. Since the market makers role is to provide liquidity to the market and not take the risk of the instrument, the risk is undesired from the market maker's view.

The biggest short-term risk of an open derivative position is the risk that the underlying price will change, thereby causing the derivative contract price to change. In order to decrease this risk the market maker can buy underlying contracts to offset this open position. The number of contracts that the market maker has to buy of the underlying instrument depends on the current delta/delta value.

Thus, if for example the delta value is 0.5 a market maker has to trade 0.5 underlying contracts for each derivative contract to hedge the open position resulting from the deal in the derivative contract. Of course, other market participants may also be interested in trading without entering an open position. When a derivative position is hedged in this way the trade is said to be delta neutral.

The price of a derivative contract may not only depend on the price of the underlying contract. For example the price of an option is also dependent on the volatility of the underlying contract. Thus, if an option contract is delta hedged the position is less exposed to price changes of the underlying contract and thus relatively more dependant on changes in the volatility of the underlying contract. This is a common way of trading option contracts. The open delta position is hedged according to the delta value. This is also called to cover the option. This can of course be done for put and call options as well as for more complex option contracts or combinations of option contracts.

The transactions required in the delta hedging of open derivative positions are done today over the phone or by phone and electronic system together. When the trade is carried out in two or more places there is always a so-called execution risk. This means that a market participant assumes that he/she can carry out both parts of the transaction and price it accordingly. When the trade is done the participants may not be able to hedge the open position at the price set when the first order was executed because the prices and/or volumes in one of the marketplaces have changed. This is usually called execution risk or liquidity risk.

Furthermore, in many automated exchange systems it is usually possible to set up combinations of securities, but these are today limited to combinations of natural numbers. For example, combination AB, sell 1 of A and buy 1 of B, or combination CD sell 2 of C and sell 1 of D. These ratios are fixed during the day and are usually used for strategies such as straddles, strangles, time spreads etc. These existing combinations do not fulfill the needs of somebody that wants to delta hedge a position because the delta of an option contract changes with the changes of the price of the underlying contract.

Combination orders usually generate derived orders in the market of the separate instruments. For example, a person may wish to sell a particular future and buy a call option derived from that particular future. When a price exists for one of the contracts, i.e., in either the future or the option, a derived order will be created in the other contract of the combination contract by the automated exchange system. This process is very demanding in terms of processing power in the matching unit utilized by the automated exchange, which is unfortunate, because the processing power of the matching unit often is a bottleneck in a conventional automated trading system.

SUMMARY

It is an object of the present invention to provide a method and a system wherein the trading of hedged derivative orders can be executed using very little processing power.

It is a further object of the present invention to provide a method and a system whereby hedged derivative orders can be traded with a low execution risk for the party entering into such a transaction.

These objects and others are obtained in a system and a method wherein both the parts of the trade are guaranteed at a price known by the parties being parts in the trade. This is achieved by creating a separate virtual instrument used in the matching in the automated exchange system. The virtual instruments created in this way can be referred to as hedged derivative instruments.

The reference instrument, i.e. the instrument in which options and other derivative contracts are traded, is then preferably displayed together with the hedged derivative instruments. The reference instrument, i.e. the underlying contract, is presented with a price. Further, the reference instrument may or may not be traded on the exchange listing the virtual hedged derivative contracts as described herein. If not, a price feed from an execution point where a real time price is given can be provided.

Thus, if a party, for example a market maker, wants to enter into a transaction without exposing it to an execution risk as described above, the party can trade in the virtual hedged derivative instrument instead. For example, if the party wants to trade an options contract and at the same time execute a corresponding trade in the contract underlying the option contract, i.e. trade what is known as a covered option, it will instead enter into a trade in a virtual hedged derivative contract corresponding to a covered option.

The system will then execute the following steps. When a trade in a virtual hedged derivative instrument is matched in the matching process of the system, the match is reported to a subsequent deal capture module where the corresponding different deals of the virtual hedged derivative contract the reference instrument are formed. The deals formed in the deal capture module do not need to be matched, since the number of contracts and the price can be deduced from the information relating to the virtual hedged derivative contract.

Typically, the output from the deal capture module receiving a matched hedged derivative contract will be one trade in a derivative contract and one trade in an instrument underlying the derivative contract. It is of course also possible to form a virtual derivative contract implying more than two simultaneous deals, if that is desired at some point.

Thus, the matching of the virtual hedged derivative contract can take place in a matching module of the automated exchange system. The trade can subsequently be captured in a separate module of the system where the combined deal is formed. All legs of the actual derivative contract and the contract in the underlying instrument are subsequently transferred to clearing/settlement and perhaps other processing.

BRIEF DESCRIPTION OF THE DRAWINGS

FIG. 2 is a screen shot illustrating an exemplary graphical user interface for use in the system of FIG. 1.

DETAILED DESCRIPTION

Figure 1:
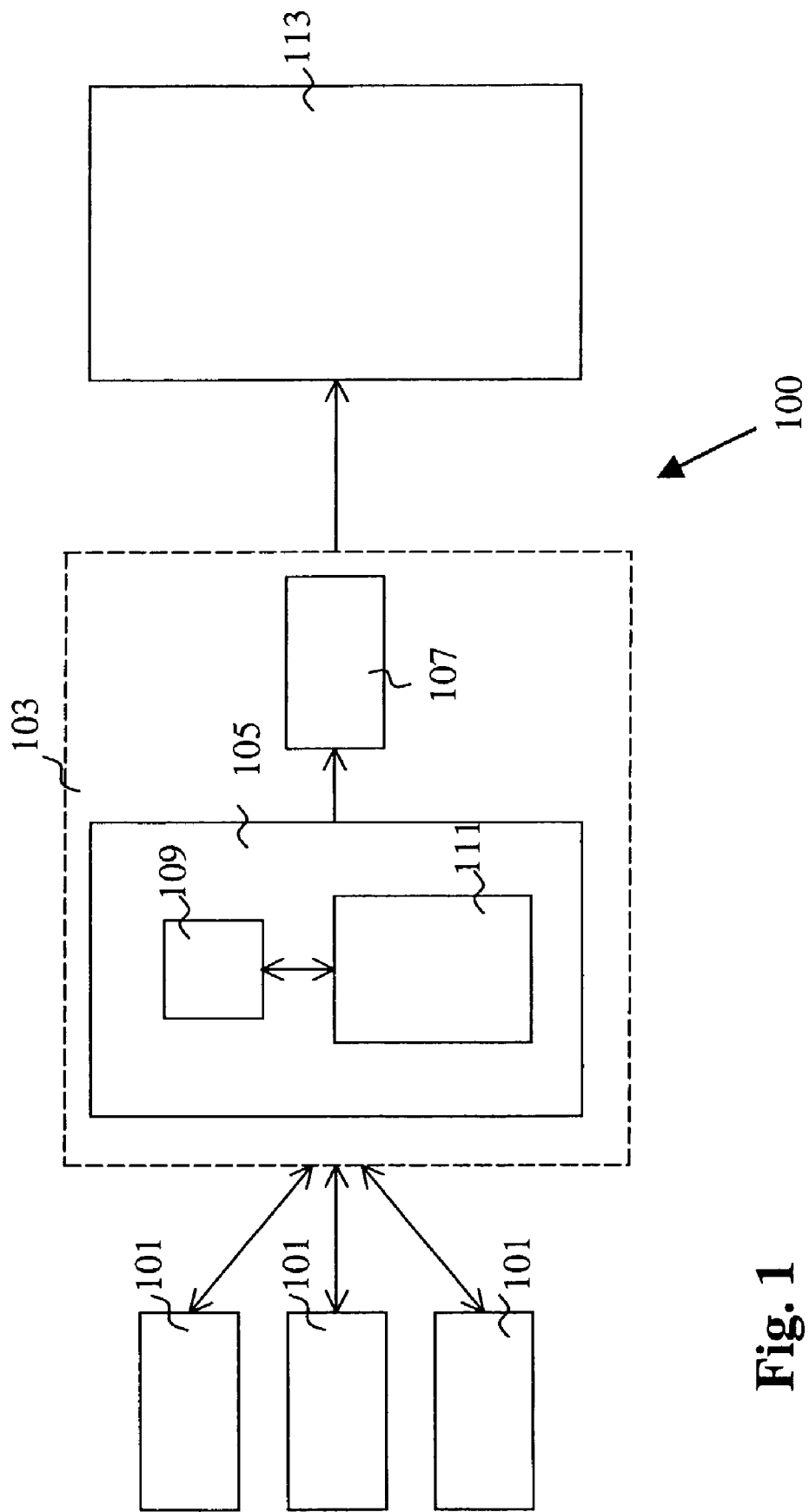
FIG. 1 is a general view of a computerized automated exchange system.

In FIG. 1, a general view of an automated exchange system 100 is shown. The system 100 comprises a number of remote terminals 101 all connected to a central computer server system 103 comprising a matching unit 105 including a computer processor 109 and an associated order book (memory) 111. The central computer server 103 is loaded with suitable software, such as the CLICK TM software sold by OMX Technology AB, Sweden, and forms an automated exchange having all features and functionality of a conventional automated exchange. The remote terminals 101 are designed to send data to and receive data from the central computer server 103. The terminals 101 are further designed to provide an interface for investors, such as broker firms etc., trading contracts including combination contracts at the automated exchange. The matching of orders input in such a system is performed in the central computer server by the unit 105 designed for this task. The system 103 further comprises a deal capture module 107. The module 107 is responsible for performing tasks such as receiving and registering a deal in a designated database and replying to requests relating to closed deals. Also, if a deal needs to be cancelled/altered, this is normally performed in the deal capture module. The system 103 may also be linked to other associated systems, such as a position keeping system 113.

The orderbook 111 of the system in FIG. 1 is further designed to handle, in addition to conventional financial instruments, separate virtual instruments used in the matching in the automated exchange system. In particular a set of virtual instruments for trading hedged derivative contracts having a reference instrument is provided. The virtual instruments created in this way can be referred to as hedged derivative instruments, and can include e.g. covered options.

The reference instrument, i.e. the instrument in which options are traded, is then preferably displayed together with the hedged derivative contract instruments. In FIG. 2, an exemplary screen shot of a covered option in IBM is displayed. The top line in FIG. 2. displays, from left to right:

the instrument traded, in this case a put option in IBM with expiration date in December and a strike price of $5,50

The Delta value calculated for a covered option, in this case 0.79

The best bid, in this case $1.63, and

The best offer, in this case $1.65

The subsequent lines display other, similar, contracts all having the IBM stock as underlying reference instrument. The reference instrument, i.e. the underlying contract, is presented with a price, see bottom row. Further, the reference instrument may or may not be traded on the specific exchange trading the virtual derivative contract. If not, a price feed from an execution point where a real time price is given can be provided.

Figure 3:
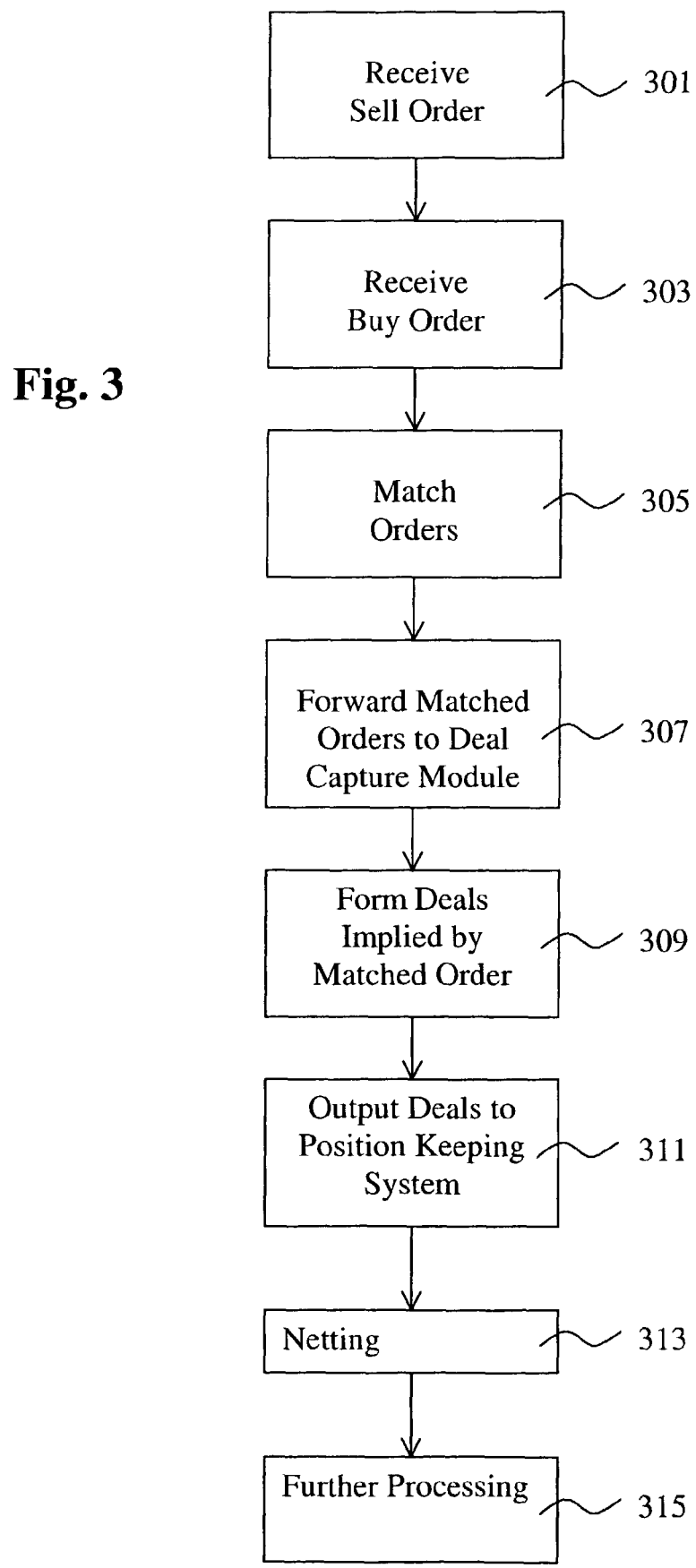
FIG. 3 is a flowchart illustrating different steps performed in the system of FIG. 1 when processing orders.

In FIG. 3, a flow chart illustrating steps performed in the system of FIG. 1 in accordance with a preferred embodiment of the invention is shown.

First, a first trader A enters an order to sell a virtual hedged derivative contract as described above. For example, an order to sell 100 contracts of a particular call option contract and at the same time cover those option contracts by buying a corresponding number of the underlying contract to make the deal delta neutral at a particular price. The sell order is then transmitted to the central matching system, where it is received at step 301. Next, a second trader B enters an order to buy a corresponding contract, matching the sell order input by trader A. The buy order is then transmitted to the central matching system. The order is received by the system, at step 303. The orders transmitted from the first and second trader are then directed to the matching unit of the central system for matching. In this case, the orders received in steps 301 and 303 match. If there is no direct match, an order may be stored in the orderbook of the system for future matching against future orders or killed depending on the type of order.

Once matched in the matching unit, step 305, the outcome of the match is forwarded to another entity, the deal capture module, step 307. Next, in a step 309, the deal captures module converts the virtual hedged derivative contracts into its implied deals, and capture those implied deals. In this example, the trade in the virtual hedged derivative contract will imply two deals together comprising four legs. Trader A will sell 100 option contracts and buy X contracts of the contract underlying the option (the reference instrument), where X will depend on the current delta value when the deal was matched. Trader B will do the opposite. I.e. trader B will buy 100 option contracts and sell X contracts in the underlying contract.

Next, the legs are output from the deal capture system and forwarded to a position keeping system, step 311. In the position keeping system netting of positions taken by the different parties during the day may take place, step 213. The positions or the net positions are then output for subsequent settlement and perhaps other processing, step 215.

The number of derivative instrument contracts will hence be according to the size traded, and the volume in the reference instrument will be according to a particular formula. In particular, in the case the traded derivative instrument is a covered option contract, the formula (size of derived covered option instrument)*(delta value)*(nominal reference contract)/(nominal derived covered option instrument) is used.

The price of the virtual hedged derivative instrument will preferably be displayed in absolute fashion by the system. For example if the leg is traded at 23 the trade will be executed at the price 23. The reference instrument price will preferably be displayed at the time of the trade.

If the reference instrument is not traded on the specific exchange this can be handled provided that the off-exchange trades can be reported to the exchange that trade the reference instrument. The options or other derived instruments that are to be hedged by the reference instrument have to have specified delta values supplied by the exchange in order to calculate a volume to be traded in the reference instrument.

The delta values can be calculated by the exchange or a third party provider. The third party provider can preferably be a vendor that already calculates the delta values for the options according to a known formula.

The market participant that wants to trade a hedged trade in accordance with the above may calculate the delta differently than the delta displayed by the exchange. This is however not a problem since the delta is displayed and made public. If the market participant calculates it differently it might be a good opportunity to actually trade in the virtual derivative instrument. All the information used in the trade is made available by the exchange, the delta value, the price of the reference contract and the price of the traded virtual derivative instrument. The virtual derivative instrument can of course be combination of securities.

Since the actual trade is only performed for the virtual derivative contract itself, the matching process as described herein is very efficient. Thus, in the matching process only the virtual derivative instrument itself is matched. Hence, no prices for derived contracts need to be calculated and no complex delta value calculations need to be performed by the processor of the matching unit. Instead, the reference instrument associated to the trade is traded at a later stage in the deal capture, i.e. after the matching but before the trade is completed and subject to clearing.

If the reference instrument was to be matched simultaneously in the matching process this would significantly reduce the performance of the matching processing, since the processor used in the matching would have to make heavy calculations related to each trade. Also, in an electronic trading system the matching process is usually one of the bottlenecks with respect to performance.

In the case when there is no available price on the reference instrument, the trades for the virtual derivative instrument itself will preferably be executed, but there will be no deal capture broadcasts with information on the trade. This is because there has to be a price on the reference instrument before the total trade can be carried out. This is especially important when the reference contract is to be reported to another exchange. There are usually rules for how much the price may deviate from the current market price reported off-exchange. Thus it is usually crucial that the trade is not carried out.

Furthermore, the delta value will change with the change of the reference instrument price. To secure that no trades are carried out when the delta values and the reference price are changed all instruments traded as virtual derivative instruments will preferably be suspended. All virtual derivative instrument orders will also be inactivated when an update is made. This is because the prices set for virtual derivative instruments before the update most certainly have to be updated after the change. If they were not inactivated a market participant may have his/her order traded before he/she could have adjusted the prices to the new environment and thus be subject to risk, which is undesired.

The method and system as described herein can also be used for trading many different types of virtual derivative contracts, in particular hedged derivative contracts such as covered options and covered futures contracts.

What is claimed is:

1. A method of simultaneous trading of a derivative contract and an underlying instrument in an automated exchange system, the system including a computer-implemented matching module and a computer-implemented deal capture module, the method comprising the steps of:

forming and providing for display a virtual instrument, the virtual instrument guaranteeing a simultaneous trade of both a derivative instrument and its underlying instrument, receiving bids and offers in said virtual instrument, the computer-implemented matching module matching the bids and offers in the virtual instrument in the matching module, and the computer-implemented matching module forwarding data relating to the matching to the computer-implemented deal capture module where a combined deal, including a trade in the derivative contract and a trade in its underlying instrument, is formed in accordance with the data related to the virtual instrument when the virtual instrument is matched.

2. A method according to claim 1, a delta value associated with the virtual instrument is displayed in the same view as the virtual instrument.

3. A method according to claim 1, further comprising the step of providing a price feed in the underlying instrument from an external execution point, when the underlying instrument is not traded on the exchange listing the virtual instrument.

4. A method according to claim 1, wherein the virtual instrument corresponds to a covered option contract.

5. A method according to claim 1, wherein a number of instruments traded in the underlying instrument is calculated as: (size of virtual instrument)*(delta value)*(nominal underlying instrument)/(nominal virtual instrument).

6. A method according to claim 1, wherein the price of the underlying instrument is displayed in the same view as the virtual instrument.

7. An automated exchange system for simultaneous trading of a derivative contract or combinations thereof and an underlying instrument, the system comprising:

a computer-implemented matching module, and a computer-implemented deal capture module, wherein the computer-implemented matching module includes electronic circuitry configured to:

form and provide for display a virtual instrument, the virtual instrument guaranteeing a simultaneous trade in both a derivative contract and its underlying instrument, receive bids and offers in said virtual instrument, match the bids and offers in the virtual instrument, and forward the data relating to the matching to the deal capture module, wherein the computer-implemented deal capture module is configured to form a combined deal including one trade in the derivative contract and one trade in its underlying instrument in accordance with the data related to the virtual derivative instrument when there is a match in the virtual instrument.

8. A system according to claim 7, wherein the price of the underlying instrument and/or a delta value associated with the virtual instrument is displayed in a same view as the virtual instrument.

9. A system according to claim 7, further comprising means for providing a price feed in the underlying instrument from an external execution point.

10. A system according to claim 7, wherein the virtual instrument corresponds to a covered option contract.

11. A system according to claim 7, comprising means for calculating a number of instruments traded in the underlying instrument as: (size of virtual instrument)*(delta value)*(nominal underlying instrument)/(nominal virtual instrument).

12. A system according to claim 7, wherein the price of the underlying instrument is displayed in a same view as the virtual instrument.

13. An exchange system, the system comprising:
a number of remote input terminals for entering bids and offers in a virtual instrument that guarantees simultaneous trading of a derivative contract and a contract underlying said derivative contract to be matched by the exchange system, the remote terminals being linked to a central computer server hosting an automated matching process of said entered bids and offers,
a matching engine for matching bids and offers in the virtual instrument,
a deal capture module provided to receive data output from a matching engine relating to matched bids and offers for the virtual instrument, the deal capture module being programmed to capture and create a first deal in the derivative contract and a second deal in the contract underlying the derivative contract in accordance with a specification of the matched virtual instrument.

14. A computer program product storing a computer program, comprising:
a computer-useable storage medium having computer code embodied therein, which when executed on a computer, causes the computer to perform the following steps:
forming and displaying a virtual instrument, the virtual instrument guaranteeing a simultaneous trade of both a derivative contract and its underlying instrument,
receiving bids and offers in said virtual instrument,
matching the bids and offers in the virtual instrument in the matching module, and
forwarding data relating to the matching to the deal capture module where a combined deal, including a trade in the derivative contract and a trade in its underlying instrument, is formed in accordance with the data related to the virtual instrument when the virtual instrument is matched.

* * * * *